(12) United States Patent
Liu et al.

(10) Patent No.: US 11,323,872 B2
(45) Date of Patent: May 3, 2022

(54) TERMINAL CAPABILITY ACQUISITION METHOD AND APPARATUS, AND COMPUTER STORAGE MEDIUM

(71) Applicant: GUANGDONG OPPO MOBILE TELECOMMUNICATIONS CORP., LTD., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/095,923

(22) Filed: Nov. 12, 2020

(65) Prior Publication Data

US 2021/0067951 A1 Mar. 4, 2021

Related U.S. Application Data

(63) Continuation of application No. PCT/CN2019/090150, filed on Jun. 5, 2019.

(30) Foreign Application Priority Data

| Jun. 5, 2018 | (CN) | 201810570203.2 |
| Sep. 27, 2018 | (CN) | 201811134304.1 |
| Oct. 24, 2018 | (CN) | 201811247208.8 |

(51) Int. Cl.
*H04W 8/24* (2009.01)

(52) U.S. Cl.
CPC ..................... *H04W 8/24* (2013.01)

(58) Field of Classification Search
CPC ............... H04W 8/24; H04W 48/18
(Continued)

(56) References Cited

U.S. PATENT DOCUMENTS

2011/0319085 A1* 12/2011 Ishii .................. H04W 88/06
455/436
2015/0295763 A1* 10/2015 Yu ..................... H04L 41/08
726/4
(Continued)

FOREIGN PATENT DOCUMENTS

| CN | 103079194 A | 5/2013 |
| CN | 103188745 A | 7/2013 |

(Continued)

OTHER PUBLICATIONS

Huawei et al: "Discussion on UE ID based capability reporting", 3GPP Draft; R2-1808265. vol. RAN WG2, No. Busan, Korea; May 21, 2018-May 25, 2018 May 20, 2018 (May 20, 2018), XP051444556.
(Continued)

*Primary Examiner* — Congvan Tran
(74) *Attorney, Agent, or Firm* — Perkins Coie LLP (57) ABSTRACT

Disclosed are a terminal capability acquisition method and apparatus, and a computer storage medium, the method comprising: a first access network device acquires first UE capability identification information or first UE capability information of a terminal; if the first access network device acquires first UE capability identification information of the terminal, then: on the basis of the first UE capability identification information and the corresponding relationship between UE capability identification information and UE capability information, the first access network device determines the first UE capability information of the terminal.

16 Claims, 3 Drawing Sheets

---

A first access network device acquires first UE capability identification information or first UE capability information of a terminal, wherein if the first access network device acquires the first UE capability identification information of the terminal, the first access network device determines the first UE capability information of the terminal based on the first UE capability identification information, and a correspondence between UE capability identification information and UE capability information

301

(58) Field of Classification Search
USPC .................................................. 370/328–329
See application file for complete search history.

(56) References Cited

U.S. PATENT DOCUMENTS

2016/0198418 A1* 7/2016 Ishikura .............. H04W 52/225
455/522
2019/0349821 A1* 11/2019 Kim ................. H04W 36/0069

FOREIGN PATENT DOCUMENTS

| CN | 106899964 A | 6/2017 |
|---|---|---|
| WO | 2013168138 A1 | 11/2013 |

OTHER PUBLICATIONS

Intel Corporation: "UE Capability ID based UE capability transfer", 3GPP Draft; R2-1807381, vol. RAN WG2, No. Busan, South Korea; May 21, 2018-May 25, 2018 May 20, 2018 (May 20, 2018), XP051443781.

CATT: "Signalling Procedures Containing UE Capability ID", 3GPP Draft; R2-1906450, vol. RAN WG2, No. Reno, USA; May 13, 2019-May 17, 2019 May 2, 2019 (May 2, 2019), XP051710765.

Nokia et al: "Introduction of Radio Capabilities Signalling Optimisation feature", 3GPP Draft; S2-1904979 Update of S2-1904478-23501-RACS Intro-Revision Nokia, vol. SA WG2, No. Reno, Nevada; May 17, 2019 May 3, 2019 (May 3, 2019), XP051735206.

QUALCOMM: "New SID: Study on optimisations on UE radio capability signalling", 3GPP Draft; S2-186047 New SID for Radio Capabi LITI ES-R13-RM, vol. SA WG2, No. Newport Beach, USA; May 28, 2018-Jun. 1, 2018 Jun. 2, 2018 (Jun. 2, 2018), XP051536395.

Mediatek Inc: "UE Capability ID—Motivation", 3GPP Draft; RP-181146 UE Capability ID, vol. TSG RAN, No. La Jolla, CA, USA; Jun. 4, 2018 (Jun. 4, 2018), XP051511342.

Supplementary European Search Report in the European application No. 19815018.7, dated May 14, 2021.

International Search Report in the international application No. PCT/CN2019/090150, dated Aug. 26, 2019.

Written Opinion of the International Search Authority in the international application No. PCT/CN2019/090150, dated Aug. 26, 2019.

3GPP TS 36.306 V13.0.0 (Dec. 2015), 3rd Generation Partnership Project; Technical Specification Group Radio Access Network; Evolved Universal Terrestrial Radio Access (E-UTRA); User Equipment (UE) radio access capabilities (Release 13), chapter 4.

3GPP TS 36.331 V13.0.0 (Dec. 2015), 3rd Generation Partnership Project; Technical Specification Group Radio Access Network; Evolved Universal Terrestrial Radio Access (E-UTRA); Radio Resource Control (RRC); Protocol specification (Release 13), chapter 5.6.3.

First Office Action of the Indian application No. 202017049164, dated Dec. 8, 2021.5 pages with English translation.

* cited by examiner

A first access network device acquires first UE capability identification information or first UE capability information of a terminal, wherein if the first access network device acquires the first UE capability identification information of the terminal, the first access network device determines the first UE capability information of the terminal based on the first UE capability identification information, and a correspondence between UE capability identification information and UE capability information — 301

TERMINAL CAPABILITY ACQUISITION METHOD AND APPARATUS, AND COMPUTER STORAGE MEDIUM

CROSS-REFERENCE TO RELATED APPLICATIONS

This is a continuation application of International Patent Application No. PCT/CN2019/090150, filed on Jun. 5, 2019, which claims priorities from Chinese Patent Application No. 201810570203.2 filed on Jun. 5, 2018, Chinese Patent Application No. 201811134304.1 filed on Sep. 27, 2018, Chinese Patent Application No. 201811247208.8 filed on Oct. 24, 2018, which are incorporated herein by reference in their entity.

BACKGROUND

At present, terminal capability information (User Equipment (UE) capability information for short) is reported to an access network during registration or registration update, and then the access network sends the terminal capability information to a core network for storage. When a terminal initiates a connection establishment request or a connection restoration request, the access network requests the terminal capability information from the core network, and then provides corresponding configurations for the terminal according to the terminal capability information.

With more and more features supported by the terminal, there will be more and more terminal capability information, which brings a huge signaling overhead to transmit the terminal capability information; at the same time, the core network needs to save the capability information of all terminals, which also brings great challenges to the core network.

SUMMARY

Technical Field

The application relates to the technical field of wireless communications, and more particularly to a method and device for acquiring a terminal capability, and a computer storage medium.

A method for acquiring a terminal capability provided by the embodiments of the disclosure may include the following operation.

A first access network device acquires first UE capability identification information or first UE capability information of a terminal.

If the first access network device acquires the first UE capability identification information of the terminal, the first access network device determines the first UE capability information of the terminal based on the first UE capability identification information, and a correspondence between UE capability identification information and UE capability information.

In an implementation, the operation that the first access network device acquires the first UE capability identification information of the terminal may include the following operation.

The first access network device acquires the first UE capability identification information of the terminal from a core network device.

In an implementation, the operation that the first access network device acquires the first UE capability identification information of the terminal from the core network device may include the following operation.

After the core network device receives a service request initiated by the terminal, the first access network device receives, through interface signaling between the first access network device and the core network device, the first UE capability identification information of the terminal that is sent by the core network device.

In an implementation, the operation that the first access network device acquires the first UE capability identification information of the terminal from the core network device may include the following operations.

The first access network device sends a UE capability identification request message or a UE capability request message to the core network device.

The first access network device receives the first UE capability identification information of the terminal that is sent by the core network device.

In an implementation, the operation that the first access network device sends the UE capability identification request message or the UE capability request message to the core network device may include the following operation.

After receiving an initial message sent by the terminal to the core network device, the first access network device sends the UE capability identification request message or the UE capability request message to the core network device through the interface signaling between the first access network device and the core network device.

In an implementation, the core network device acquires the first UE capability identification information in the following manners.

The terminal sends the first UE capability identification information to the first access network device or a second access network device, and the first access network device or the second access network device sends the first UE capability identification information of the terminal to the core network device.

Or, the terminal sends the first UE capability identification information to the core network device through an interface protocol between the terminal and the core network device.

In an implementation, the core network device acquires the first UE capability identification information in the following manner.

The core network device acquires the first UE capability identification information of the terminal from a signatory device of the terminal.

In an implementation, the operation that the core network device acquires the first UE capability identification information of the terminal from the signatory device of the terminal may include the following operation.

The core network device sends first UE identification information of the terminal to the signatory device, such that the signatory device determines the first UE capability identification information of the terminal and/or a correspondence between the first UE capability identification information and the first UE capability information of the terminal based on the first UE identification information of the terminal, and sends the first UE capability identification information of the terminal and/or the correspondence between the first UE capability identification information and the first UE capability information of the terminal to the core network device.

In an implementation, the operation that the first access network device acquires the first UE capability identification information of the terminal may include the following operation.

The first access network device acquires the first UE capability identification information of the terminal from the terminal.

In an implementation, the operation that the first access network device acquires the first UE capability identification information of the terminal from the terminal may include the following operation.

The first access network device acquires the first UE capability identification information of the terminal from the terminal according to the first UE identification information of the terminal.

In an implementation, the operation that the first access network device acquires the first UE capability identification information of the terminal from the terminal may include the following operation.

The first access network device receives the first UE capability identification information sent by the terminal.

In an implementation, the operation that the first access network device receives the first UE capability identification information sent by the terminal may include the following operations.

The first access network device sends a UE capability identification request message or a UE capability request message to the terminal.

The first access network device receives the first UE capability identification information sent by the terminal.

In an implementation, the operation that the first access network device acquires the first UE capability identification information of the terminal may include the following operation.

The first access network device acquires the first UE capability identification information of the terminal from the second access network device.

In an implementation, the operation that the first access network device acquires the first UE capability identification information of the terminal from the second access network device may include the following operation.

The first access network device acquires the first UE capability identification information of the terminal from the second access network device according to the first UE identification information of the terminal.

In an implementation, the first access network device acquires the correspondence between the UE capability identification information and the UE capability information in at least one of the following manners.

The first access network device determines the correspondence between the UE capability identification information and the UE capability information according to provisions in a protocol.

The first access network device acquires the correspondence between the UE capability identification information and the UE capability information from a signatory device.

The first access network device generates the correspondence between the UE capability identification information and the UE capability information.

In an implementation, the operation that the first access network device acquires the first UE capability information of the terminal may include the following operation.

The first access network device acquires the first UE capability information of the terminal from the core network device.

In an implementation, the operation that the first access network device acquires the first UE capability information of the terminal from the core network device may include the following operation.

The first access network device acquires the first UE capability information of the terminal from the core network device according to the first UE identification information of the terminal.

In an implementation, the operation that the first access network device acquires the first UE capability information of the terminal from the core network device may include the following operation.

The first access network device receives, through interface signaling between the first access network device and the core network device, the first UE capability information of the terminal that is sent by the core network device.

In an implementation, the operation that the first access network device acquires the first UE capability information of the terminal from the core network device may include the following operations.

The first access network device sends a UE capability request message to the core network device.

The first access network device receives the first UE capability information of the terminal that is sent by the core network device.

In an implementation, the operation that the first access network device sends the UE capability identification request message or the UE capability request message to the core network device may include the following operation.

After receiving an initial message sent by the terminal to the core network device, the first access network device sends the UE capability request message to the core network device through the interface signaling between the first access network device and the core network device.

In an implementation, the operation that the first access network device acquires the first UE capability information of the terminal from the core network device may include the following operations.

The first access network device sends the first UE identification information of the terminal to the core network device, such that the core network device determines the first UE capability identification information of the terminal based on the first UE identification information of the terminal, and determines the first UE capability information of the terminal based on the correspondence between the UE capability identification information and the UE capability information.

In an implementation, the core network device acquires the first UE capability identification information in the following manner.

The terminal sends the first UE capability identification information to the first access network device or a second access network device, and the first access network device or the second access network device sends the first UE capability identification information of the terminal to the core network device.

Or, the terminal sends the first UE capability identification information to the core network device through an interface protocol between the terminal and the core network device.

In an implementation, the core network device acquires the first UE capability identification information in the following manner.

The core network device acquires the first UE capability identification information of the terminal from a signatory device of the terminal.

In an implementation, the operation that the core network device acquires the first UE capability identification information of the terminal from the signatory device of the terminal may include the following operation.

The core network device sends first UE identification information of the terminal to the signatory device, such that the signatory device determines the first UE capability identification information of the terminal and/or a correspondence between the first UE capability identification information and the first UE capability information of the terminal based on the first UE identification information of the terminal, and sends the first UE capability identification information of the terminal and/or the correspondence between the first UE capability identification information and the first UE capability information of the terminal to the core network device.

In an implementation, the core network device acquires the first UE capability information of the terminal in the following manner.

The core network device acquires the first UE capability information of the terminal from a signatory device of the terminal.

In an implementation, the operation that the core network device acquires the first UE capability information of the terminal from the signatory device of the terminal may include the following operation.

The core network device sends the first UE identification information of the terminal and/or the first UE capability identification information of the terminal to the signatory device, such that the signatory device determines the first UE capability information according to the first UE identification information of the terminal and/or the first UE capability identification information of the terminal, and sends the first UE capability information of the terminal to the core network device.

In an implementation, the first UE capability identification information of the terminal is the first UE identification information of the terminal.

Or, the first UE capability identification information of the terminal is identification information determined based on the first UE identification information of the terminal and specified identification information.

In an implementation, the first UE capability identification information of the terminal includes permanent identification information of the terminal or temporary identification information of the terminal.

In an implementation, the first UE capability identification information of the terminal is uniquely determined in at least one of the following ranges:

a worldwide range, a range of a Public Land Mobile Network (PLMN), a range of the core network device, a range of the access network device, and a range of a registration region.

In an implementation, the correspondence between the UE capability identification information and the UE capability information is determined based on the PLMN, the first access network device side or the core network device side or the signatory device side determining, according to a first PLMN registered or selected by the terminal, a correspondence between UE capability identification information and UE capability information that are corresponding to the first PLMN, thereby determining the first UE capability information corresponding to the first UE capability identification information of the terminal.

In an implementation, the first UE capability identification information of the terminal is determined based on the PLMN, the first access network device side or the core network device side or the signatory device side determining, according to the first PLMN registered or selected by the terminal, the first UE capability identification information corresponding to the first PLMN.

In an implementation, one or more PLMNs are simultaneously registered or selected by the terminal, and the terminal reports respective UE capability identification information to each PLMN.

In an implementation, the correspondence between the UE capability identification information and the UE capability information is determined based on a network slice, the first access network device side or the core network device side or the signatory device side determining, according to a first network slice registered or selected by the terminal, a correspondence between UE capability identification information and UE capability information that are corresponding to the first network slice, thereby determining the first UE capability information corresponding to the first UE capability identification information of the terminal.

In an implementation, the first UE capability identification information of the terminal is determined based on the network slice, the first access network device side or the core network device side or the signatory device side determining, according to the first network slice registered or selected by the terminal, the first UE capability identification information corresponding to the first network slice.

In an implementation, one or more network slices are simultaneously registered or selected by the terminal, and the terminal reports respective UE capability identification information to each network slice.

A device for acquiring a terminal capability provided by the embodiments of the disclosure may include: an acquisition unit.

The acquisition unit is configured to acquire first UE capability identification information or first UE capability information of a terminal.

If the first access network device acquires the first UE capability identification information of the terminal, the first access network device determines the first UE capability information of the terminal based on the first UE capability identification information, and a correspondence between UE capability identification information and UE capability information.

In an implementation, the acquisition unit may include: a first acquisition subunit.

The first acquisition subunit is configured to acquire the first UE capability identification information of the terminal from a core network device.

In an implementation, the first acquisition subunit is configured to receive, after the core network device receives a service request initiated by the terminal, through interface signaling between the first access network device and the core network device, the first UE capability identification information of the terminal that is sent by the core network device.

In an implementation, the first acquisition subunit is configured to send a UE capability identification request message or a UE capability request message to the core network device; and receive the first UE capability identification information of the terminal that is sent by the core network device.

In an implementation, the first acquisition subunit is configured to send, after receiving an initial message sent by the terminal to the core network device, the UE capability identification request message or the UE capability request message to the core network device through the interface signaling between the first access network device and the core network device.

In an implementation, the core network device acquires the first UE capability identification information in the following manner.

The terminal sends the first UE capability identification information to the first access network device or a second access network device, and the first access network device or the second access network device sends the first UE capability identification information of the terminal to the core network device.

Or, the terminal sends the first UE capability identification information to the core network device through an interface protocol between the terminal and the core network device.

In an implementation, the core network device acquires the first UE capability identification information in the following manner.

The core network device acquires the first UE capability identification information of the terminal from a signatory device of the terminal.

In an implementation, the operation that the core network device acquires the first UE capability identification information of the terminal from the signatory device of the terminal may include the following operation.

The core network device sends first UE identification information of the terminal to the signatory device, such that the signatory device determines the first UE capability identification information of the terminal and/or a correspondence between the first UE capability identification information and the first UE capability information of the terminal based on the first UE identification information of the terminal, and sends the first UE capability identification information of the terminal and/or the correspondence between the first UE capability identification information and the first UE capability information of the terminal to the core network device.

In an implementation, the acquisition unit may include: a second acquisition subunit.

The second acquisition subunit is configured to acquire the first UE capability identification information of the terminal from the terminal.

In an implementation, the second acquisition subunit is configured to acquire the first UE capability identification information of the terminal from the terminal according to the first UE identification information of the terminal.

In an implementation, the second acquisition subunit is configured to receive the first UE capability identification information sent by the terminal.

In an implementation, the second acquisition subunit is configured to send a UE capability identification request message or a UE capability request message to the terminal; and receive the first UE capability identification information sent by the terminal.

In an implementation, the acquisition unit may include: a third acquisition subunit.

The third acquisition subunit is configured to acquire the first UE capability identification information of the terminal from the second access network device.

In an implementation, the third acquisition subunit is configured to acquire the first UE capability identification information of the terminal from the second access network device according to the first UE identification information of the terminal.

In an implementation, the acquisition unit is further configured to acquire the correspondence between the UE capability identification information and the UE capability information in at least one of the following manners:

The correspondence between the UE capability identification information and the UE capability information is determined according to provisions in a protocol.

The correspondence between the UE capability identification information and the UE capability information is acquired from a signatory device.

The correspondence between the UE capability identification information and the UE capability information is generated.

In an implementation, the acquisition unit may include: a fourth acquisition subunit.

The fourth acquisition subunit is configured to acquire the first UE capability information of the terminal from the core network device.

In an implementation, the fourth acquisition subunit is configured to acquire the first UE capability information of the terminal from the core network device according to the first UE identification information of the terminal.

In an implementation, the fourth acquisition subunit is configured to receive, after the core network device receives the service request initiated by the terminal, through the interface signaling between the first access network device and the core network device, the first UE capability information of the terminal that is sent by the core network device.

In an implementation, the fourth acquisition subunit is configured to send a UE capability request message to the core network device; and receive the first UE capability information of the terminal that is sent by the core network device.

In an implementation, the fourth acquisition subunit is configured to send, after receiving the initial message sent by the terminal to the core network device, the UE capability request message to the core network device through the interface signaling between the first access network device and the core network device.

In an implementation, the fourth acquisition subunit is configured to send the first UE identification information of the terminal to the core network device, such that the core network device determines the first UE capability identification information of the terminal based on the first UE identification information of the terminal, and determines the first UE capability information of the terminal based on the correspondence between the UE capability identification information and the UE capability information.

In an implementation, the core network device acquires the first UE capability identification information in the following manner.

The terminal sends the first UE capability identification information to the first access network device or a second access network device, and the first access network device or the second access network device sends the first UE capability identification information of the terminal to the core network device.

Or, the terminal sends the first UE capability identification information to the core network device through an interface protocol between the terminal and the core network device.

In an implementation, the core network device acquires the first UE capability identification information in the following manner.

The core network device acquires the first UE capability identification information of the terminal from a signatory device of the terminal.

In an implementation, the operation that the core network device acquires the first UE capability identification information of the terminal from the signatory device of the terminal may include the following operation.

The core network device sends first UE identification information of the terminal to the signatory device, such that the signatory device determines the first UE capability identification information of the terminal and/or a correspondence between the first UE capability identification information and the first UE capability information of the terminal based on the first UE identification information of the terminal, and sends the first UE capability identification information of the terminal and/or the correspondence between the first UE capability identification information and the first UE capability information of the terminal to the core network device.

In an implementation, the core network device acquires the first UE capability information of the terminal in the following manner.

The core network device acquires the first UE capability information of the terminal from a signatory device of the terminal.

In an implementation, the operation that the core network device acquires the first UE capability information of the terminal from the signatory device of the terminal may include the following operation.

The core network device sends the first UE identification information of the terminal and/or the first UE capability identification information of the terminal to the signatory device, such that the signatory device determines the first UE capability information according to the first UE identification information of the terminal and/or the first UE capability identification information of the terminal, and sends the first UE capability information of the terminal to the core network device.

In an implementation, the first UE capability identification information of the terminal is the first UE identification information of the terminal.

Or, the first UE capability identification information of the terminal is identification information determined based on the first UE identification information of the terminal and specified identification information.

In an implementation, the first UE capability identification information of the terminal includes permanent identification information of the terminal or temporary identification information of the terminal.

In an implementation, the first UE capability identification information of the terminal is uniquely determined in at least one of the following ranges:

a worldwide range, a range of a PLMN, a range of the core network device, a range of the access network device, and a range of a registration region.

In an implementation, the correspondence between the UE capability identification information and the UE capability information is determined based on the PLMN, the first access network device side or the core network device side or the signatory device side determining, according to a first PLMN registered or selected by the terminal, a correspondence between UE capability identification information and UE capability information that are corresponding to the first PLMN, thereby determining the first UE capability information corresponding to the first UE capability identification information of the terminal.

In an implementation, the first UE capability identification information of the terminal is determined based on the PLMN, the first access network device side or the core network device side or the signatory device side determining, according to the first PLMN registered or selected by the terminal, the first UE capability identification information corresponding to the first PLMN.

In an implementation, one or more PLMNs are simultaneously registered or selected by the terminal, and the terminal reports respective UE capability identification information to each PLMN.

In an implementation, the correspondence between the UE capability identification information and the UE capability information is determined based on a network slice, the first access network device side or the core network device side or the signatory device side determining, according to a first network slice registered or selected by the terminal, a correspondence between UE capability identification information and UE capability information that are corresponding to the first network slice, thereby determining the first UE capability information corresponding to the first UE capability identification information of the terminal.

In an implementation, the first UE capability identification information of the terminal is determined based on the network slice, the first access network device side or the core network device side or the signatory device side determining, according to the first network slice registered or selected by the terminal, the first UE capability identification information corresponding to the first network slice.

In an implementation, one or more network slices are simultaneously registered or selected by the terminal, and the terminal reports respective UE capability identification information to each network slice.

A computer storage medium provided by the embodiments of the disclosure stores a computer executable instruction thereon; and the computer executable instruction is implemented by a processor to implement the above method for acquiring the terminal capability.

BRIEF DESCRIPTION OF THE DRAWINGS

The accompanying drawings are described here to provide a further understanding of the application, and form a part of the application. The schematic embodiments and description of the present invention are adopted to explain the application, and do not form improper limits to the application. In the drawings.

DETAILED DESCRIPTION

The embodiments of the disclosure may be applied to various communication systems, for example, the Global System of Mobile communication (GSM), a Code Division Multiple Access (CDMA) system, a Wideband Code Division Multiple Access (WCDMA) system, the General Packet Radio Service (GPRS), the Universal Mobile Telecommunication System (UMTS), a Long Term Evolution (LTE) system, and evolution systems of the LTE system like an Advanced Long Term Evolution (LTE-A) system, a New Radio (NR) system and evolution systems of the NR system, such as a NR-based access to Unlicensed spectrum (NR-U) system or the next generation communication system.

Figure 1:
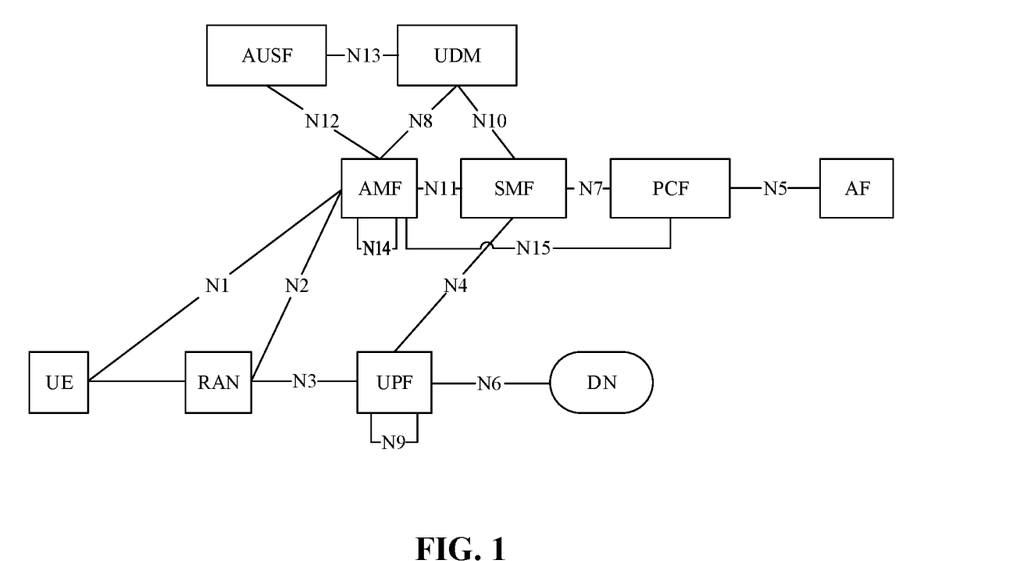
FIG. 1 is a system architecture diagram of a 5th Generation (5G) network.

FIG. 1 is a system architecture diagram of a 5G network. As shown in FIG. 1, devices involved in a 5G network system include as follows.

UE, Radio Access Network (RAN), User Plane Function (UPF), Data Network (DN), Core Access and Mobility Management Function (AMF), Session Management Function (SMF), Policy Control function (PCF), Application Function (AF), Authentication Server Function (AUSF), and Unified Data Management (UDM).

Figure 2:
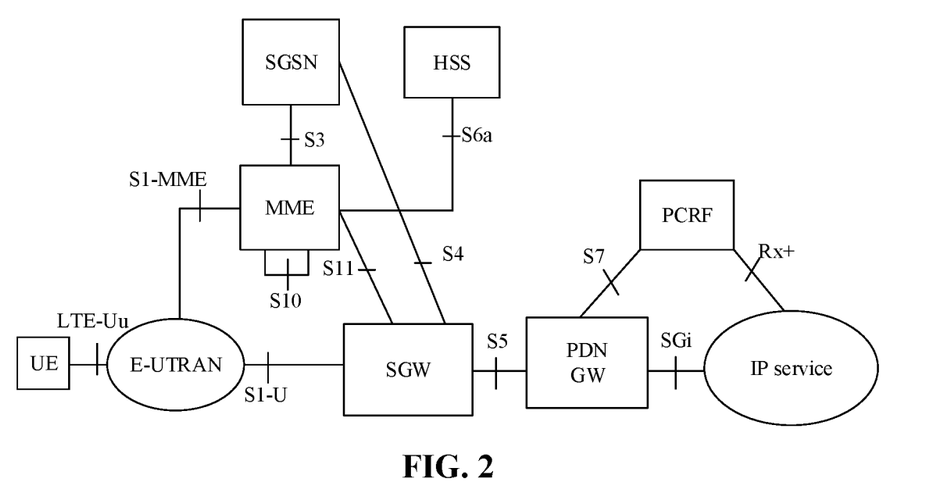
FIG. 2 is a system architecture diagram of a 4th Generation (4G) network.

FIG. 2 is a system architecture diagram of a 4G network. As shown in FIG. 2, devices involved in a 4G network system include as follows.

UE, Evolved Universal Terrestrial Radio Access Network (E-UTRAN), Mobility Management Entity (MME) network element, Serving GPRS Support Node (SGSN), Home Subscriber Server (HSS), Serving Gateway (SG), Packet Data Network (PDN) gateway, and Policy and Charging Rules Function (PCRF).

The examples in FIG. 1 and FIG. 2 above are only examples of network architecture for realizing the embodiments of the disclosure, and the embodiments of the disclosure are not limited to the network structures shown in FIG. 1 and FIG. 2.

Figure 3:
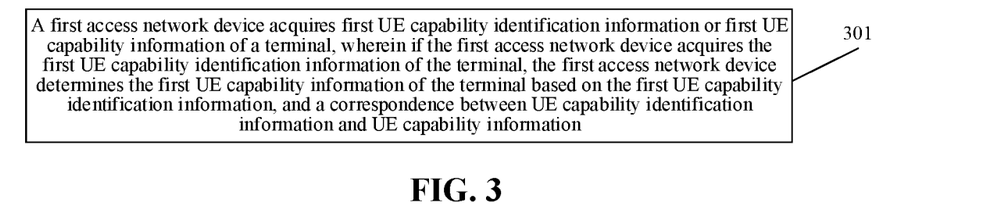
FIG. 3 is a first flowchart of a method for acquiring a terminal capability according to an embodiment of the disclosure.

FIG. 3 is a first flowchart of a method for acquiring a terminal capability according to an embodiment of the disclosure. As shown in FIG. 3, the method for acquiring the terminal capability may include the following step.

At 301: a first access network device acquires first UE capability identification information or first UE capability information of a terminal, wherein if the first access network device acquires the first UE capability identification information of the terminal, the first access network device determines the first UE capability information of the terminal based on the first UE capability identification information, and a correspondence between UE capability identification information and UE capability information.

In the embodiment of the disclosure, the first access network device may be a base station.

In the embodiments of the disclosure, the first UE capability information includes various capabilities supported by the terminal, such as Radio Access Type (RAT) supported by the terminal, frequency band supported by the terminal, power level of the terminal, whether the terminal supports Certificate Authority (CA), whether the terminal supports Protection Switching (PS) handover, and security algorithm supported by the terminal.

In the embodiments of the disclosure, the first UE capability identification information may be implemented in the following manners.

1) The first UE capability identification information of the terminal is first UE identification information of the terminal.

2) The first UE capability identification information of the terminal is identification information determined based on the first UE identification information of the terminal and specified identification information.

In the embodiment of the disclosure, there are two manners for the first access network device to acquire the first UE capability information.

First acquisition manner: the first access network device acquires the first access network device determines the first UE capability identification information of the terminal; and determines the first UE capability information of the terminal based on the first UE capability identification information, and the correspondence between the UE capability identification information and the UE capability information.

Second acquisition manner: the first access network device directly acquires the first UE capability information.

In an implementation, the first UE capability identification information of the terminal includes permanent identification information of the terminal or temporary identification information of the terminal.

In an implementation, the first UE capability identification information of the terminal is UE capability identification information for a service type, and when the first UE capability identification information is reported by the terminal, the terminal further reports the service type corresponding to the first UE capability identification information. Further, the UE capability identification information corresponding to different service types is different in length.

Herein, the service type is Enhanced Mobile Broadband (eMBB), Massive Machine Type Communication (mMTC), Ultra-reliable and Low Latency Communication (URLLC), and Vehicle to Everything (V2X), etc. For the service type such as the eMBB, the mMTC, the URLLC and the V2X, the length of the UE capability identification information is different.

In an implementation, the first UE capability identification information of the terminal is uniquely determined in at least one of the following ranges:

a worldwide range, a range of a PLMN, a range of information of a manufacturer to which the terminal belongs, a range of information of a network operator, a range of information of a service provider, a range of the core network device, a range of the access network device, and a range of a registration region.

In an implementation, the correspondence between the UE capability identification information and the UE capability information is determined based on the range information, the first access network device side or the core network device side or the signatory device side determining, according to first range information registered or selected by the terminal, a correspondence between UE capability identification information and UE capability information that are corresponding to the first range information, thereby determining the first UE capability information corresponding to the first UE capability identification information of the terminal. The range information includes at least one of: the information of the PLMN, the information of the manufacturer to which the terminal belongs, the information of the network operator, and the information of the service provider.

Herein, the information of the manufacturer to which the terminal belongs includes at least one of: identification information of the manufacturer, and a name of the manufacturer. Further, if the information of the manufacturer to which the terminal belongs includes the identification information of the manufacturer, the identification information of the manufacturer is allocated based on the PLMN or allocated by the same institution.

Further, the first UE capability identification information of the terminal is determined based on the PLMN, the first access network device side or the core network device side or the signatory device side determining, according to a first PLMN registered or selected by the terminal, the first UE capability identification information corresponding to the first PLMN. Herein, one or more PLMNs are simultaneously registered or selected by the terminal, and the terminal reports respective UE capability identification information to each PLMN.

In an implementation, the correspondence between the UE capability identification information and the UE capability information is determined based on a network slice, the first access network device side or the core network device side or the signatory device side determining, according to a first network slice registered or selected by the terminal, a correspondence between UE capability identification information and UE capability information that are corresponding to the first network slice, thereby determining the first UE capability information corresponding to the first UE capability identification information of the terminal. Further, the first UE capability identification information of the terminal is determined based on the network slice, the first access network device side or the core network device side or the signatory device side determining, according to the first network slice registered or selected by the terminal, the first UE capability identification information corresponding to the first network slice. Herein, one or more network slices are simultaneously registered or selected by the terminal, and the terminal reports respective UE capability identification information to each network slice.

In an implementation, when the correspondence between the UE capability identification information and the UE capability information of the terminal is determined based on the PLMN, the first UE capability identification information is based on the PLMN, the first UE capability identification information based on the PLMN has different formats, and the format refers to a length of the UE capability identification information and/or information included by the UE capability identification information. Further, the format of the first UE capability identification information based on the PLMN is predefined in a protocol.

Optionally, when the first UE capability identification information is reported by the terminal, the terminal further reports format information supported by the first UE capability identification information.

In the technical solutions provided by the embodiments of the disclosure, the first access network device acquires the first UE capability identification information or the first UE capability information of the terminal, wherein if the first access network device acquires the first UE capability identification information of the terminal, the first access network device determines the first UE capability information of the terminal based on the first UE capability identification information, and the correspondence between UE capability identification information and UE capability information. By adopting the technical solutions provided by the embodiments of the disclosure, the UE capability information corresponds to the UE capability identification information, so the terminal/access network/core network may acquire corresponding UE capability information based on the UE capability identification information when acquiring the UE capability information, thereby reducing the signaling overhead.

The above two manners are respectively described below with specific embodiments.

Figure 4:
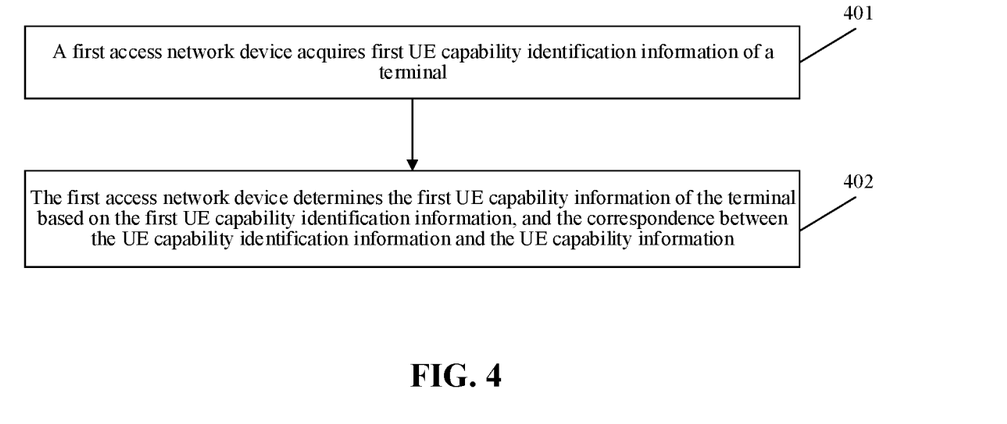
FIG. 4 is a second flowchart of a method for acquiring a terminal capability according to an embodiment of the disclosure.

FIG. 4 is a second flowchart of a method for acquiring a terminal capability according to an embodiment of the disclosure. As shown in FIG. 4, the method for acquiring the terminal capability may include the following step.

At 401: a first access network device acquires first UE capability identification information of a terminal.

In the embodiment of the disclosure, the operation that the first access network device acquires the first UE capability identification information of the terminal may be implemented in the following manners.

Manner 1: the first access network device acquires the first UE capability identification information of the terminal from a core network device.

The first access network device acquires the first UE capability information of the terminal from the core network device according to the first UE identification information of the terminal.

Herein, the operation that the first access network device acquires the first UE capability identification information of the terminal from the core network device may be implemented in the following manners.

1) After the core network device receives a service request initiated by the terminal, the first access network device receives, through interface signaling between the first access network device and the core network device, the first UE capability identification information of the terminal that is sent by the core network device.

2) The first access network device sends a UE capability identification request message or a UE capability request message to the core network device; and the first access network device receives the first UE capability identification information of the terminal that is sent by the core network device.

Further, the operation that the first access network device sends the UE capability identification request message or the UE capability request message to the core network device may include the following operation.

After receiving an initial message sent by the terminal to the core network device, the first access network device sends the UE capability identification request message or the UE capability request message to the core network device through the interface signaling between the first access network device and the core network device.

For the manner 1, the core network device acquires the first UE capability identification information in the following manners.

1.1) The terminal sends the first UE capability identification information to the first access network device or a second access network device, and the first access network device or the second access network device sends the first UE capability identification information of the terminal to the core network device; or 1.2) the terminal sends the first UE capability identification information to the core network device through an interface protocol between the terminal and the core network device.

The disclosure is not limited thereto. In the embodiment of the disclosure, the first access network device or the core network device acquires the first UE capability information and the corresponding first UE capability identification information from the terminal; or the first access network device or the core network device acquires the first UE capability information from the terminal, to allocate the corresponding first UE capability identification information to the first UE capability information. Further, the first access network acquires the first UE capability information and the corresponding first UE capability identification information from the terminal, and sends the first UE capability information and the corresponding first UE capability identification information to the core network.

In an implementation, the core network sends the first UE capability information and the corresponding first UE capability identification information of the terminal, and/or, the first UE identification information of the terminal to a signatory server of the terminal. Further, the signatory server of the terminal stores or updates the first UE capability information and the corresponding first UE capability identification information of the terminal, and/or, the first UE identification information of the terminal.

It is to be noted that the first UE capability information and the corresponding first UE capability identification information of the terminal are configured at the terminal side in a pre-configurating manner.

Optionally, the first access network device or the core network further acquires range information to which the first UE capability identification information belongs when acquiring the first UE capability identification information from the terminal. The range information includes at least one of: the information of the PLMN, the information of the manufacturer to which the terminal belongs, the information of the network operator, and the information of the service provider.

Herein, the information of the manufacturer to which the terminal belongs includes at least one of: identification information of the manufacturer, and the name of the manufacturer. Further, the information of the manufacturer to which the terminal belongs includes at least one of: identification information of the manufacturer, and the name of the manufacturer.

Further, the range information is indicated by Application Function (AF) information.

In the embodiment of the disclosure, after acquiring the first UE capability identification information and the range information to which the first UE capability identification information belongs from the terminal, the core network determines a correspondence between the UE capability identification information belonging to the range information and the UE capability information, and determines the first UE capability information corresponding to the first UE capability identification information based on the correspondence. The core network acquires the correspondence through a gateway interface from an external server corresponding to range information reported by the terminal, and determines the first UE capability information corresponding to the first UE capability identification information according to the correspondence; or the core network acquires the first UE capability information corresponding to the first UE capability identification information through the gateway interface from the external server corresponding to the range information reported by the terminal.

In an implementation, if the correspondence is updated, the terminal reports, to the core network, indication information for indicating that the correspondence is updated; and after receiving the indication information, the core network acquires an updated correspondence from an external server corresponding to range information reported by the terminal. Further, the terminal reports the indication information to the core network while reporting the first UE capability identification information to the core network; or the terminal respectively reports the first UE capability identification information and the indication information.

In an implementation, if the core network receives from the terminal that the first UE capability identification information is not included in the correspondence, the core network acquires an updated correspondence from an external server corresponding to range information reported by the terminal; or the core network requests the external server corresponding to the range information reported by the terminal for acquiring the first UE capability information corresponding to the first UE capability indication information, and adds a correspondence between the first UE capability identification information and the first UE capability information to the correspondence.

In an implementation, the core network device acquires the first UE capability identification information of the terminal from the signatory device of the terminal. Further, the core network device sends first UE identification information of the terminal to the signatory device, such that the signatory device determines the first UE capability identification information of the terminal and/or a correspondence between the first UE capability identification information and the first UE capability information of the terminal based on the first UE identification information of the terminal, and sends the first UE capability identification information of the terminal and/or the correspondence between the first UE capability identification information and the first UE capability information of the terminal to the core network device.

Manner 2: the first access network device acquires the first UE capability identification information of the terminal from the terminal.

The first access network device acquires the first UE capability identification information of the terminal from the terminal according to the first UE identification information of the terminal.

Herein, the first access network device receives the first UE capability identification information sent by the terminal.

During specific implementation, the first access network device sends the UE capability identification request message or the UE capability request message to the terminal; and the first access network device receives the first UE capability identification information sent by the terminal.

Manner 3: the first access network device acquires the first UE capability identification information of the terminal from the second access network device.

The first access network device acquires the first UE capability identification information of the terminal from the second access network device according to the first UE identification information of the terminal.

At 402: the first access network device determines the first UE capability information of the terminal based on the first UE capability identification information, and the correspondence between the UE capability identification information and the UE capability information.

In an embodiment of the disclosure, the first access network device acquires the correspondence between the UE capability identification information and the UE capability information in at least one of the following manners.

The first access network device determines the correspondence between the UE capability identification information and the UE capability information according to provisions in a protocol.

The first access network device acquires the correspondence between the UE capability identification information and the UE capability information from a signatory device; and The first access network device generates the correspondence between the UE capability identification information and the UE capability information.

Figure 5:
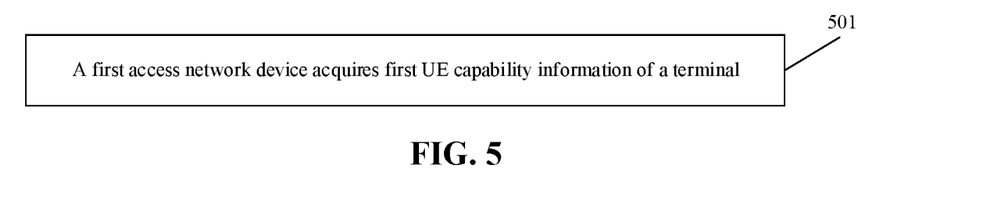
FIG. 5 is a third flowchart of a method for acquiring a terminal capability according to an embodiment of the disclosure.

FIG. 5 is a third flowchart of a method for acquiring a terminal capability according to an embodiment of the disclosure. As shown in FIG. 5, the method for acquiring the terminal capability may include the following step.

At 501: a first access network device acquires first UE capability information of a terminal.

Herein, the first access network device acquires the first UE capability information of the terminal from a core network device. Further, the operation that the first access network device acquires the first UE capability information of the terminal from the core network device may be implemented in the following manners.

Manner 1: after the core network device receives the service request initiated by the terminal, the first access network device receives, through the interface signaling between the first access network device and the core network device, the first UE capability information of the terminal that is sent by the core network device.

Manner 2: the first access network device sends the UE capability request message to the core network device; and the first access network device receives the first UE capability information of the terminal that is sent by the core network device. Further, after receiving the initial message sent by the terminal to the core network device, the first access network device sends the UE capability request message to the core network device through the interface signaling between the first access network device and the core network device.

In the embodiment of the disclosure, the operation that the first access network device acquires the first UE capability information of the terminal from the core network device may be implemented in the following manner: the first access network device sends the first UE identification information of the terminal to the core network device, such that the core network device determines the first UE capability identification information of the terminal based on the first UE identification information of the terminal, and determines the first UE capability information of the terminal based on the correspondence between the UE capability identification information and the UE capability information. Further, the core network device acquires the first UE capability identification information in the following manners.

1.1) The terminal sends the first UE capability identification information to the first access network device or the second access network device, and the first access network device or the second access network device sends the first UE capability identification information of the terminal to the core network device; or 1.2) the terminal sends the first UE capability identification information to the core network device through the interface protocol between the terminal and the core network device.

2) The core network device acquires the first UE capability identification information of the terminal from the signatory device of the terminal. Further, the core network device sends first UE identification information of the terminal to the signatory device, such that the signatory device determines the first UE capability identification information of the terminal and/or a correspondence between the first UE capability identification information and the first UE capability information of the terminal based on the first UE identification information of the terminal, and sends the first UE capability identification information of the terminal and/or the correspondence between the first UE capability identification information and the first UE capability information of the terminal to the core network device.

In the embodiment of the disclosure, the core network device acquires the first UE capability information in the following manner: the core network device acquires the first UE capability information of the terminal from the signatory device of the terminal. Herein, the core network device sends the first UE identification information of the terminal and/or the first UE capability identification information of the terminal to the signatory device, such that the signatory device determines the first UE capability information according to the first UE identification information of the terminal and/or the first UE capability identification information of the terminal, and sends the first UE capability information of the terminal to the core network device.

Figure 6:
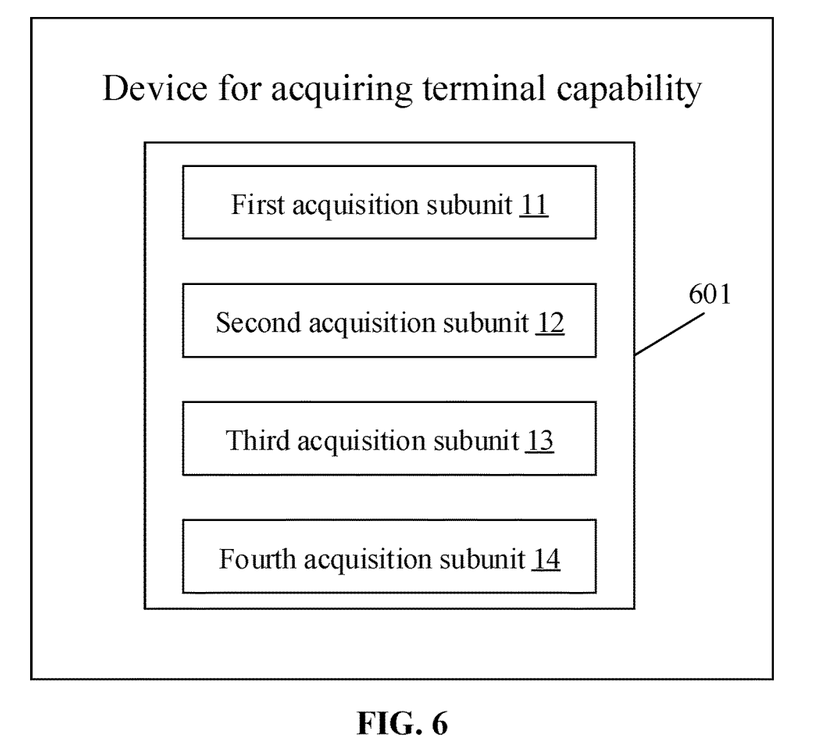
FIG. 6 is a structural schematic diagram of a device for acquiring a terminal capability according to an embodiment of the disclosure.

FIG. 6 is a structural schematic diagram of a device for acquiring a terminal capability according to an embodiment of the disclosure. As shown in FIG. 6, the device for acquiring the terminal capability may include: an acquisition unit 601.

The acquisition unit 601 is configured to acquire first UE capability identification information or first UE capability information of a terminal.

If the first access network device acquires the first UE capability identification information of the terminal, the first access network device determines the first UE capability information of the terminal based on the first UE capability identification information, and a correspondence between UE capability identification information and UE capability information.

In an implementation, the acquisition unit 601 may include: a first acquisition subunit 11.

The first acquisition subunit 11 is configured to acquire the first UE capability identification information of the terminal from a core network device.

In an implementation, the fourth acquisition subunit 11 is configured to receive, after the core network device receives the service request initiated by the terminal, through the interface signaling between the first access network device and the core network device, the first UE capability information of the terminal that is sent by the core network device.

In an implementation, the first acquisition subunit 11 is configured to send a UE capability identification request message or a UE capability request message to the core network device; and receive the first UE capability identification information of the terminal that is sent by the core network device.

In an implementation, the first acquisition subunit 11 is configured to send, after receiving an initial message sent by the terminal to the core network device, the UE capability identification request message or the UE capability request message to the core network device through the interface signaling between the first access network device and the core network device.

In an implementation, the core network device acquires the first UE capability identification information in the following manner.

The terminal sends the first UE capability identification information to the first access network device or a second access network device, and the first access network device or the second access network device sends the first UE capability identification information of the terminal to the core network device.

Or, the terminal sends the first UE capability identification information to the core network device through an interface protocol between the terminal and the core network device.

The disclosure is not limited thereto. In the embodiment of the disclosure, the first access network device or the core network device acquires the first UE capability information and the corresponding first UE capability identification information from the terminal; or the first access network device or the core network device acquires the first UE capability information from the terminal, to allocate the corresponding first UE capability identification information to the first UE capability information. Further, the first access network acquires the first UE capability information and the corresponding first UE capability identification information from the terminal, and sends the first UE capability information and the corresponding first UE capability identification information to the core network.

In an implementation, the core network sends the first UE capability information and the corresponding first UE capability identification information of the terminal, and/or, the first UE identification information of the terminal to a signatory server of the terminal. Further, the signatory server of the terminal stores or updates the first UE capability information and the corresponding first UE capability identification information of the terminal, and/or, the first UE identification information of the terminal.

It is to be noted that the first UE capability information and the corresponding first UE capability identification information of the terminal are configured at the terminal side in a pre-configurating manner.

Optionally, the first access network device or the core network further acquires range information to which the first UE capability identification information belongs when acquiring the first UE capability identification information from the terminal. The range information includes at least one of: the information of the PLMN, the information of the manufacturer to which the terminal belongs, the information of the network operator, and the information of the service provider.

Herein, the information of the manufacturer to which the terminal belongs includes at least one of: identification information of the manufacturer, and the name of the manufacturer. Further, if the information of the manufacturer to which the terminal belongs includes the identification information of the manufacturer, the identification information of the manufacturer is allocated based on the PLMN or allocated by the same institution.

Further, the range information is indicated by AF information.

In the embodiment of the disclosure, after acquiring the first UE capability identification information and the range information to which the first UE capability identification information belongs from the terminal, the core network determines a correspondence between the UE capability identification information belonging to the range information and the UE capability information, and determines the first UE capability information corresponding to the first UE capability identification information based on the correspondence. The core network acquires the correspondence through a gateway interface from an external server corresponding to range information reported by the terminal, and determines the first UE capability information corresponding to the first UE capability identification information according to the correspondence; or the core network acquires the first UE capability information corresponding to the first UE capability identification information through the gateway interface from the external server corresponding to the range information reported by the terminal.

In an implementation, if the correspondence is updated, the terminal reports, to the core network, indication information for indicating that the correspondence is updated; and after receiving the indication information, the core network acquires an updated correspondence from an external server corresponding to range information reported by the terminal. Further, the terminal reports the indication information to the core network while reporting the first UE capability identification information to the core network; or the terminal respectively reports the first UE capability identification information and the indication information.

In an implementation, if the core network receives from the terminal that the first UE capability identification information is not included in the correspondence, the core network acquires an updated correspondence from an external server corresponding to range information reported by the terminal; or the core network requests the external server corresponding to the range information reported by the terminal for acquiring the first UE capability information corresponding to the first UE capability indication information, and adds a correspondence between the first UE capability identification information and the first UE capability information to the correspondence.

In an implementation, the core network device acquires the first UE capability identification information in the following manner.

The core network device acquires the first UE capability identification information of the terminal from a signatory device of the terminal.

In an implementation, the operation that the core network device acquires the first UE capability identification information of the terminal from the signatory device of the terminal may include the following operation.

The core network device sends first UE identification information of the terminal to the signatory device, such that the signatory device determines the first UE capability identification information of the terminal and/or a correspondence between the first UE capability identification information and the first UE capability information of the terminal based on the first UE identification information of the terminal, and sends the first UE capability identification information of the terminal and/or the correspondence between the first UE capability identification information and the first UE capability information of the terminal to the core network device.

In an implementation, the acquisition unit 601 may include: a second acquisition subunit 12.

The second acquisition subunit 12 is configured to acquire the first UE capability identification information of the terminal from the terminal. Further, the second acquisition subunit 12 is configured to acquire the first UE capability identification information of the terminal from the terminal according to the first UE identification information of the terminal.

In an implementation, the second acquisition subunit 12 is configured to receive the first UE capability identification information sent by the terminal.

In an implementation, the second acquisition subunit 12 is configured to send a UE capability identification request message or a UE capability request message to the terminal; and receive the first UE capability identification information sent by the terminal.

In an implementation, the acquisition unit 601 may include: a third acquisition subunit 13.

The third acquisition subunit 13 is configured to acquire the first UE capability identification information of the terminal from the second access network device. Further, the third acquisition subunit 13 is configured to acquire the first UE capability identification information of the terminal from the second access network device according to the first UE identification information of the terminal.

In an implementation, the acquisition unit 601 is further configured to acquire the correspondence between the UE capability identification information and the UE capability information in at least one of the following manners.

The correspondence between the UE capability identification information and the UE capability information is determined according to provisions in a protocol.

The correspondence between the UE capability identification information and the UE capability information is acquired from a signatory device.

The correspondence between the UE capability identification information and the UE capability information is generated.

In an implementation, the acquisition unit 601 may include: a fourth acquisition subunit 13.

The fourth acquisition subunit 14 is configured to acquire the first UE capability information of the terminal from the core network device. Further, the fourth acquisition subunit 14 is configured to acquire the first UE capability information of the terminal from the core network device according to the first UE identification information of the terminal.

In an implementation, the fourth acquisition subunit 14 is configured to receive, after the core network device receives the service request initiated by the terminal, through the interface signaling between the first access network device and the core network device, the first UE capability information of the terminal that is sent by the core network device.

In an implementation, the fourth acquisition subunit 14 is configured to send a UE capability request message to the core network device; and receive the first UE capability information of the terminal that is sent by the core network device.

In an implementation, the fourth acquisition subunit 14 is configured to send, after receiving the initial message sent by the terminal to the core network device, the UE capability request message to the core network device through the interface signaling between the first access network device and the core network device.

In an implementation, the fourth acquisition subunit 14 is configured to send the first UE identification information of the terminal to the core network device, such that the core network device determines the first UE capability identification information of the terminal based on the first UE identification information of the terminal, and determines the first UE capability information of the terminal based on the correspondence between the UE capability identification information and the UE capability information.

In an implementation, the core network device acquires the first UE capability identification information in the following manner.

The terminal sends the first UE capability identification information to the first access network device or a second access network device, and the first access network device or the second access network device sends the first UE capability identification information of the terminal to the core network device.

Or, the terminal sends the first UE capability identification information to the core network device through an interface protocol between the terminal and the core network device.

In an implementation, the core network device acquires the first UE capability identification information in the following manner.

The core network device acquires the first UE capability identification information of the terminal from a signatory device of the terminal.

In an implementation, the operation that the core network device acquires the first UE capability identification information of the terminal from the signatory device of the terminal may include the following operation.

The core network device sends first UE identification information of the terminal to the signatory device, such that the signatory device determines the first UE capability identification information of the terminal and/or a correspondence between the first UE capability identification information and the first UE capability information of the terminal based on the first UE identification information of the terminal, and sends the first UE capability identification information of the terminal and/or the correspondence between the first UE capability identification information and the first UE capability information of the terminal to the core network device.

In an implementation, the core network device acquires the first UE capability information of the terminal in the following manner.

The core network device acquires the first UE capability information of the terminal from a signatory device of the terminal.

In an implementation, the operation that the core network device acquires the first UE capability information of the terminal from the signatory device of the terminal may include the following operation.

The core network device sends the first UE identification information of the terminal and/or the first UE capability identification information of the terminal to the signatory device, such that the signatory device determines the first UE capability information according to the first UE identification information of the terminal and/or the first UE capability identification information of the terminal, and sends the first UE capability information of the terminal to the core network device.

In an implementation, the first UE capability identification information of the terminal is the first UE identification information of the terminal.

Or, the first UE capability identification information of the terminal is identification information determined based on the first UE identification information of the terminal and specified identification information.

In an implementation, the first UE capability identification information of the terminal includes permanent identification information of the terminal or temporary identification information of the terminal.

In an implementation, the first UE capability identification information of the terminal is UE capability identification information for a service type, and when the first UE capability identification information is reported by the terminal, the terminal further reports the service type corresponding to the first UE capability identification information. Further, the UE capability identification information corresponding to different service types is different in length.

Herein, the service type is eMBB, Massive mMTC, URLLC, and V2X, etc. For the service type such as the eMBB, the mMTC, the URLLC and the V2X, the length of the UE capability identification information is different.

In an implementation, the first UE capability identification information of the terminal is uniquely determined in at least one of the following ranges:

a worldwide range, a range of a PLMN, a range of information of a manufacturer to which the terminal belongs, a range of information of a network operator, a range of information of a service provider, a range of the core network device, a range of the access network device, and a range of a registration region.

In an implementation, the correspondence between the UE capability identification information and the UE capability information is determined based on the range information, the first access network device side or the core network device side or the signatory device side determining, according to first range information registered or selected by the terminal, a correspondence between UE capability identification information and UE capability information that are corresponding to the first range information, thereby determining the first UE capability information corresponding to the first UE capability identification information of the terminal.

The range information includes at least one of: the information of the PLMN, the information of the manufacturer to which the terminal belongs, the information of the network operator, and the information of the service provider.

In an implementation, the first UE capability identification information of the terminal is determined based on the PLMN, the first access network device side or the core network device side or the signatory device side determining, according to a first PLMN registered or selected by the terminal, the first UE capability identification information corresponding to the first PLMN.

In an implementation, one or more PLMNs are simultaneously registered or selected by the terminal, and the terminal reports respective UE capability identification information to each PLMN.

In an implementation, the correspondence between the UE capability identification information and the UE capability information is determined based on a network slice, the first access network device side or the core network device side or the signatory device side determining, according to a first network slice registered or selected by the terminal, a correspondence between UE capability identification information and UE capability information that are corresponding to the first network slice, thereby determining the first UE capability information corresponding to the first UE capability identification information of the terminal.

In an implementation, the first UE capability identification information of the terminal is determined based on the network slice, the first access network device side or the core network device side or the signatory device side determining, according to the first network slice registered or selected by the terminal, the first UE capability identification information corresponding to the first network slice.

In an implementation, one or more network slices are simultaneously registered or selected by the terminal, and the terminal reports respective UE capability identification information to each network slice.

In an implementation, when the correspondence between the UE capability identification information and the UE capability information of the terminal is determined based on the PLMN, the first UE capability identification information is based on the PLMN, the first UE capability identification information based on the PLMN has different formats, and the format refers to a length of the UE capability identification information and/or information included by the UE capability identification information. Further, the format of the first UE capability identification information based on the PLMN is predefined in a protocol.

Optionally, when the first UE capability identification information is reported by the terminal, the terminal further reports format information supported by the first UE capability identification information.

Those skilled in the art should understand that functions realized by each unit in the device for acquiring the terminal capability shown in FIG. 6 may be understood with reference to related descriptions about the method for acquiring the terminal capability. The functions of each unit in the device for acquiring the terminal capability shown in FIG. 6 may be realized through a program running in a processor, and may also be realized through a specific logical circuit.

When being implemented in form of software functional module and sold or used as an independent product, the device for acquiring the terminal capability in the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a piece of computer equipment (which may be a personal computer, a server, network equipment or the like) to execute all or part of the method in each embodiment of the disclosure. The storage medium includes: various media capable of storing program codes such as a U disk, a mobile hard disk, a Read Only Memory (ROM), a magnetic disk or an optical disk. By doing so, the embodiments of the disclosure are not limited to any specific combination of hardware and software.

Correspondingly, an embodiment of the disclosure further provides a computer storage medium, which stores a computer executable instruction thereon; and the computer executable instruction is implemented by a processor to implement the above method for acquiring the terminal capability in the embodiments of the disclosure.

Figure 7:
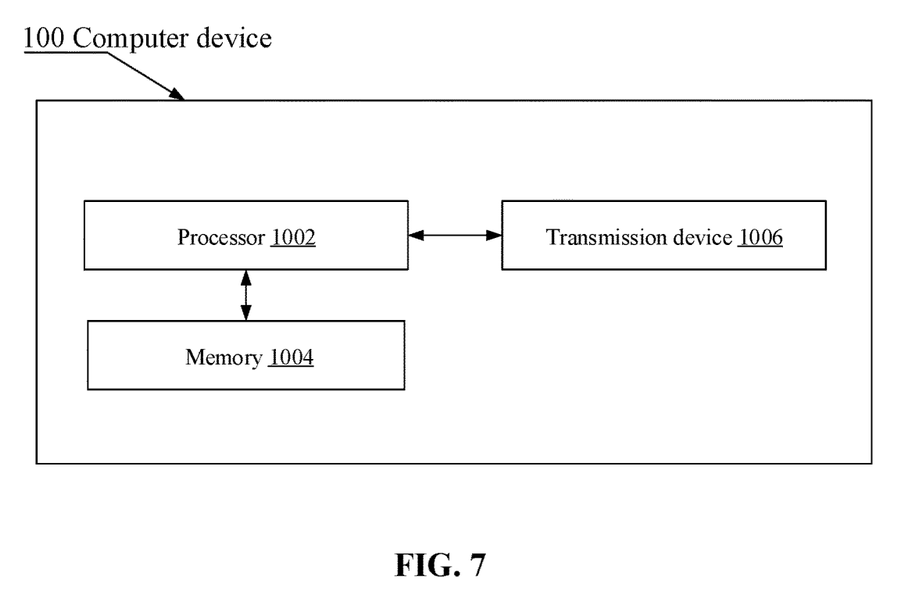
FIG. 7 is a structural schematic diagram of a computer device according to an embodiment of the disclosure.

FIG. 7 is a structural schematic diagram of a computer device according to an embodiment of the disclosure. The computer device may be an access network device, a core network device and a terminal. As shown in FIG. 7, the computer device 100 may include one or more (only one is illustrated in the figure) processors 1002 (the processor 1002 may include, but not limited to, a processing device such as a Micro Control Unit (MCU) or a Field Programmable Gate Array (FPGA)), a memory 1004 configured to store data and a transmission device 1006 configured for a communication function. Those of ordinary skill in the art should know that the structure shown in FIG. 7 is only schematic and not intended to limit the structure of the electronic device. For example, the computer device 100 may further include components more or fewer than the components shown in FIG. 7 or has a configuration different from that shown in FIG. 7.

The memory 1004 may be configured to store a software program of application software and a module, for example, a program instruction/module corresponding to a method in the embodiments of the disclosure. The processor 1002 runs the software program and module stored in the memory 1004, thereby executing various functional applications and data processing, namely implementing the above-mentioned method. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transmission device 1006 is configured to receive or send data through a network. A specific example of the network may include a wireless network provided by a communication provider of the computer device 100. In an example, the transmission device 1006 includes a Network Interface Controller (NIC), which may be connected with another network device through a base station, thereby communicating with the Internet. In an example, the transmission device 1006 may be a Radio Frequency (RF) module, configured to communicate with the Internet in a wireless manner.

The technical solutions recorded in the embodiments of the disclosure may be freely combined without conflicts.

In some embodiments provided by the disclosure, it is to be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, various function units in various embodiment of the disclosure may be integrated into a second processing unit, each unit may also exist independently, and two or more than two unit may also be integrated into a unit. The integrated unit may be implemented in a hardware form, and may also be implemented in form of hardware and software function unit.

The above is only the specific implementation of the application and not intended to limit the scope of protection of the application. Any variations or replacements apparent to those skilled in the art within the technical scope disclosed by the application shall fall within the scope of protection of the application.

The invention claimed is:

1. A method for acquiring a terminal capability, comprising:
   acquiring, by a first access network device, first User Equipment (UE) capability identification information of a terminal,
   determining, by the first access network device, the first UE capability information of the terminal based on the first UE capability identification information and a correspondence between UE capability identification information and UE capability information;
   wherein acquiring, by the first access network device, the first UE capability identification information of the terminal comprises:
   acquiring, by the first access network device, the first UE capability identification information of the terminal from a core network device;
   wherein the first UE capability identification information of the terminal of the core network device is acquired in the following manner:
   a second access network device acquires the first UE capability identification information from the terminal, and the second access network device sends the first UE capability identification information of the terminal to the core network device.

2. The method of claim 1, wherein acquiring, by the first access network device, the first UE capability identification information of the terminal from the core network device comprises:
   after the core network device receives a service request initiated by the terminal, receiving, by the first access network device, through interface signaling between the first access network device and the core network device, the first UE capability identification information of the terminal that is sent by the core network device.

3. The method of claim 1, wherein acquiring, by the first access network device, the first UE capability identification information of the terminal from the core network device comprises:
   sending, by the first access network device, a UE capability identification request message or a UE capability request message to the core network device; and
   receiving, by the first access network device, the first UE capability identification information of the terminal that is sent by the core network device.

4. The method of claim 3, wherein sending, by the first access network device, the UE capability identification request message or the UE capability request message to the core network device comprises:
   upon the reception of an initial message, which is sent by the terminal to the core network device, sending, by the first access network device, the UE capability identification request message or the UE capability request message to the core network device through the interface signaling between the first access network device and the core network device.

5. The method of claim 1, wherein
   the first access network device or the core network device acquires the first UE capability information and the corresponding first UE capability identification information from the terminal; or
   the first access network device or the core network device acquires the first UE capability information from the terminal, to allocate the corresponding first UE capability identification information to the first UE capability information.

6. The method of claim 5, wherein the first access network acquires the first UE capability information and the corresponding first UE capability identification information from the terminal, and sends the first UE capability information and the corresponding first UE capability identification information to the core network.

7. The method of claim 5, wherein the core network sends the first UE capability information and the corresponding first UE capability identification information of the terminal, and/or, the first UE identification information of the terminal to a signatory server of the terminal.

8. The method of claim 7, wherein the signatory server of the terminal stores or updates the first UE capability information and the corresponding first UE capability identification information of the terminal, and/or, the first UE identification information of the terminal.

9. A device for acquiring a terminal capability, comprising:
   a transceiver, configured to acquire first User Equipment (UE) capability identification information of a terminal,
   a processor, configured to determine the first UE capability information of the terminal based on the first UE capability identification information, and a correspondence between UE capability identification information and UE capability information;
   wherein the transceiver is configured to acquire the first UE capability identification information of the terminal from a core network device;
   wherein the first UE capability identification information of the terminal of the core network device is acquired in the following manner:

a second access network device acquires the first UE capability identification information from the terminal, and the second access network device sends the first UE capability identification information of the terminal to the core network device.

10. The device of claim 9, wherein the transceiver is configured to receive, after the core network device receives a service request initiated by the terminal, through interface signaling between the first access network device and the core network device, the first UE capability identification information of the terminal that is sent by the core network device.

11. The device of claim 9, wherein the transceiver is configured to send a UE capability identification request message or a UE capability request message to the core network device; and receive the first UE capability identification information of the terminal that is sent by the core network device.

12. The device of claim 11, wherein the transceiver is configured to send, after receiving an initial message sent by the terminal to the core network device, the UE capability identification request message or the UE capability request message to the core network device through the interface signaling between the first access network device and the core network device.

13. The device of claim 9, wherein
the first access network device or the core network device acquires the first UE capability information and the corresponding first UE capability identification information from the terminal; or
the first access network device or the core network device acquires the first UE capability information from the terminal, to allocate the corresponding first UE capability identification information to the first UE capability information.

14. The device of claim 13, wherein the first access network acquires the first UE capability information and the corresponding first UE capability identification information from the terminal, and sends the first UE capability information and the corresponding first UE capability identification information to the core network.

15. The device of claim 13, wherein the core network sends the first UE capability information and the corresponding first UE capability identification information of the terminal, and/or the first UE identification information of the terminal to a signatory server of the terminal.

16. A non-transitory computer storage medium having stored computer executable instructions thereon that when executed by a processor, cause the processor implement a method for acquiring a terminal capability, the method comprising:
acquiring, by a first access network device, first User Equipment (UE) capability identification information of a terminal,
determining, by the first access network device, the first UE capability information of the terminal based on the first UE capability identification information and a correspondence between UE capability identification information and UE capability information;
wherein acquiring, by the first access network device, the first UE capability identification information of the terminal comprises:
acquiring, by the first access network device, the first UE capability identification information of the terminal from a core network device;
wherein the first UE capability identification information of the terminal of the core network device is acquired in the following manner:
a second access network device acquires the first UE capability identification information from the terminal, and the second access network device sends the first UE capability identification information of the terminal to the core network device.

* * * * *